April 8, 1930.  J. A. GUERIN, SR., ET AL  1,753,783
UTENSIL FOR MAKING DRIP COFFEE
Filed Oct. 2, 1929
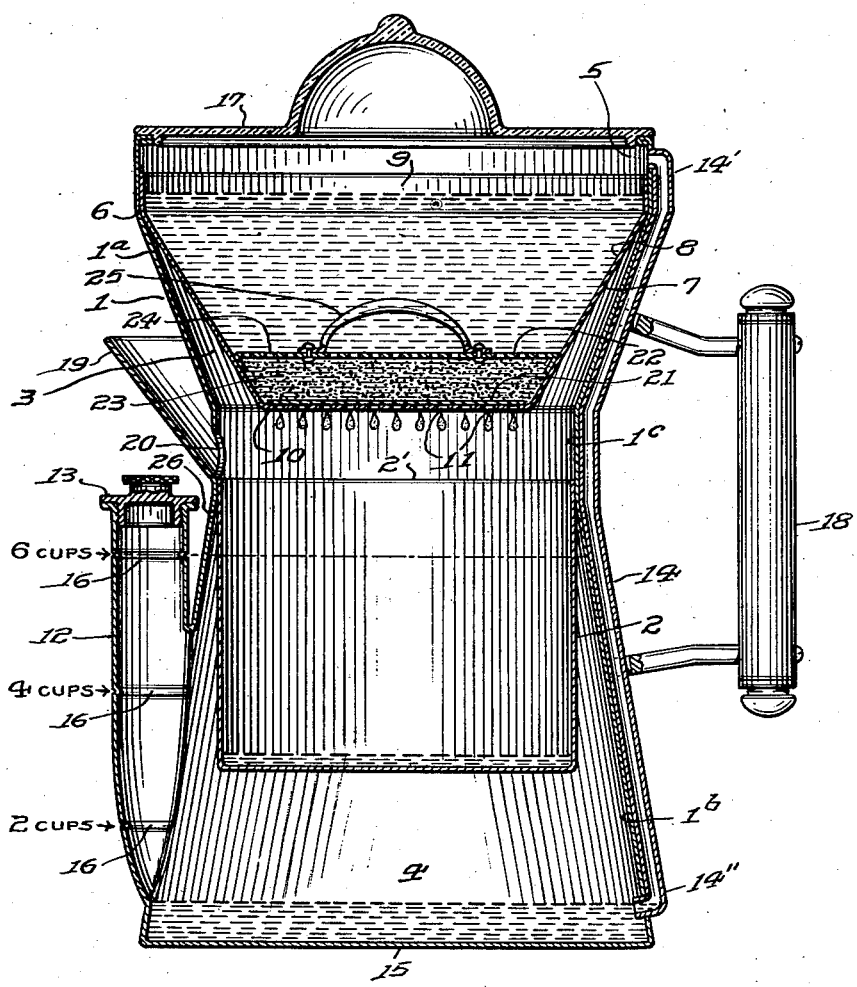
INVENTORS
Joseph A. Guerin, Sr.
James M. Guerin.
WITNESS Patented Apr. 8, 1930

1,753,783

UNITED STATES PATENT OFFICE

JOSEPH A. GUERIN, SR., AND JAMES M. GUERIN, OF PHILADELPHIA, PENNSYLVANIA

UTENSIL FOR MAKING DRIP COFFEE

Application filed October 2, 1929. Serial No. 396,613.

Our invention relates to those pots and similar utensils, which are used for the making of coffee beverages, and more particularly to the construction of a utensil in which the finest pulverized coffee is used from which to make the infusion, and in which the water which is used passes but once and at substantially boiling temperature, through the finely pulverized particles of coffee.

Heretofore drip coffee has generally been prepared by placing the pulverized coffee, packaged in cloth bags or similar filtering material, into a receptacle having a foraminous or perforated bottom and then pouring, by hand, over the coffee, boiling water, the quantity of water being sufficient to make the desired number of cups. But, although the excellence of French drip coffee is universally admitted, the time required to arrange the bags so as to retard the flow of water through the coffee and to prevent it from flowing around and not through the bag or bags, to first heat the water and then pour the right quantity of it over the bags of coffee in such a way as to extract all the fragrance contained in the coffee, involves so many considerations and details and so much care and attention that the coffee maker now usually resorts to the use of ground (not pulverized) coffee and to an ordinary percolator for the making of his coffee beverages.

But no ordinary perforated or closely woven wire fabric, generally used in percolators will retain the exceedingly fine particles of which pulverized coffee, such as is used in making French drip coffee is composed. An infusion of coffee the grains of which will be retained in the basket of a percolator, may be good, but it does not have the aroma and taste that properly prepared French drip coffee has.

It is the object of this invention to provide a coffee making utensil in which French drip coffee may be prepared with the least care, trouble or attention; in which an easily measured quantity of cold or hot water may be placed in a compartment of the utensil provided therefor, and the proper quantity of powdered coffee may be placed in another receptacle therein; and to provide a pot which will operate automatically to make French drip coffee beverage, and always of the same quality, whether the water is heated rapidly or slowly.

Further objects of our invention will appear in the specification and claim below.

The drawing forming a part of this application illustrates a vertical central sectional view of a coffee making utensil embodying our invention, with the contents substantially all in the coffee infusing receptacle as they are immediately after the water has been quickly transferred thereto. The utensil comprises an outer casing 1, of sheet or enameled or cast material, preferably circular in horizontal cross-section, and flaring slightly toward the top and toward the bottom from an intermediate portion or section thereof. The casing provides an upper section $1^a$, a lower section $1^b$, an intermediate section $1^c$ and a drip collecting receptacle 2 rigidly mounted within the casing and having the upper portion of its side wall snugly fitting against and retained on the inner surface of said intermediate section $1^c$ of the casing 1 making a steam tight joint between the upper section $1^a$ and the lower section $1^b$ and dividing the interior of said casing into an upper infusing chamber 3 in the upper portion thereof and a water boiling chamber 4 in the lower portion thereof.

By reason of the downwardly flaring wall of the lower section $1^b$, the major portion of the wall of the drip collecting receptacle 2 is spaced from the inner wall of the casing 1 and the said receptacle 2 hangs suspended well down into the water boiling chamber 4, so that during the operation of the device, the outer wall of the drip collecting receptacle 2 is jacketed with either hot water or steam.

The drip collecting receptacle 2 is rigidly and permanently secured to the inner surface of the casing 1 by soldering or sweating or spot welding the top marginal edge 2' thereof to the casing 1.

The upper section $1^a$ of the casing 1 is preferably provided with a short cylindrical portion 5 at the top thereof whence the wall tapers downwardly conically toward the intermediate portion $1^c$, thus forming at the lower boundary of the cylindrical portion 5 a shoulder 6 by which the infusing receptacle 7 is suspended and retained in position within the coffee infusing chamber 3.

The lower portion 8 of the side wall of the infusing receptacle 7 tapers downwardly and is spaced from the interior surface of the upper section $1^a$ below the shoulder 6. Above the said downwardly tapering conical wall 8, the said receptacle 7 is provided with a narrow cylindrical portion 9 fitting within the cylindrical portion 5 of the upper section $1^a$ of the casing with the angle between the wall portions 8 and 9 seated on the shoulder 6.

The lower conical wall of the infusing receptacle 7 is impervious, but the bottom wall 10 thereof is pervious, normally permitting a liquid to pass readily therethrough, for the bottom 10 is provided with a number of relatively small perforations 11.

The lower section $1^b$ of the casing 1 is provided with a pipe or passage 12 through which the desired amount of water may be introduced into the water boiling chamber 4 upon the removal of the plug or stopper 13 which is adapted to tightly close the upper end of said pipe or passage 12 and to prevent any leakage of steam thereby. In the drawing, this water supply pipe or passage is shown on the front of the lower part of the casing for the purpose of showing all of the component parts of the device in a single figure, but it is to be understood that this water supply pipe 12 may be disposed anywhere around the outer surface of the casing 1 and preferably on a lateral side thereof where the top thereof is of easy access for the introduction of water into the water boiling chamber 4.

On the outside of the casing 1 is provided a water elevating pipe or tube 14 which may be rigidly secured thereto by soldering, or brazing the same to the outer surface of the casing 1. The upper end 14′ of this pipe passes through the upper cylindrical wall 9 of the upper section 1 of the casing and is in communication with the infusion chamber 3 above the upper edge of the infusing receptacle 7 and the lower end 14″ passes through the lower portion of the casing 1 and is in communication with the water boiling chamber 4 but this inlet to the lower end 14″ of the pipe 14 is preferably substantially spaced well above the bottom 15 of the utensil so that some of the water contained therein will be retained in the water boiling chamber and will not be transferred, as will be later described, to the infusing receptacle 7 during the operation of the device.

The water supply pipe 12 is preferably provided with rings or graduations 16—16 to any one of which the chamber 4 may be readily filled with water in order that the user may place in the water boiling chamber the quantity of water necessary to produce the desired number of cups of coffee beverage.

The upper end of the coffee infusing chamber 3 is preferably closed with a glass lid or top 17. The utensil is also provided with a handle 18 and a nose or spout 19, the latter surrounding the lower edge of a hole or passage 20 through the intermediate portion $1^c$ of the casing just above the upper edge of the drip collecting receptacle 2.

The utensil is also preferably provided, when to be used, with a circular filter fabric, which preferably lies flat against and covers the pervious bottom 10 of the infusing receptacle 7, and with a coffee retainer 22.

In using the device sheet 21 of filtering material, either paper or filter cloth, circular in shape, and covering the entire surface of the bottom wall 10 of the coffee making receptacle 7 is first placed. The requisite quantity of pulverized coffee 23 is then placed upon the filter cloth and upon the coffee thus put in the receptacle 7 is placed the coffee retainer 22 which consists of a circular disk of metal provided with perforations 24, and with a handle 25 for the ready insertion or removal thereof. This retainer 22 is for the purpose of preventing the coffee from floating away from the bottom of the receptacle 7 after the water is added thereto and to maintain the coffee in an even layer so that the water is required to slowly seep through a definite thickness of very finely pulverized coffee before it can make its exit from the coffee making receptacle 7 through the filter 21 and perforations 11.

The capacity of the coffee making receptacle 7 is preferably no less than and is preferably substantially equal to the capacity of the water boiling chamber 4 above the point where the lower end 14″ of the pipe enters the chamber and, of course, the capacity of the drip collecting receptacle 2 should be no less than and substantially equal to that of the infusing receptacle 7.

At some convenient point near the top of the lower section $1^b$ of the casing, a small vent hole 26 is provided. Preferably this is just below the point where the upper end of the coffee collecting receptacle is secured to the inner wall of the casing 1. For the sake of simplifying the drawing, it is shown under the nose 19, because it may be so placed when the section $1^b$ flares downwardly and the water remaining in the chamber 4 would not reach the hole 26 when the pot is tilted in pouring, but to avoid any likelihood of water leaking therethrough when pouring it may be located at any other point preferably nearer the handle 18.

In using this device, which in the drawing is shown as of 6 cups capacity, the screw-threaded plug or closure 13 is removed and water, either hot or cold, is poured into the water boiling chamber through the pipe or tube 14 up to the proper place as indicated by the graduations 16 formed therein. For making four cups of coffee, water should be placed in the water boiling chamber until it reaches the top level at the intermediate graduation shown in the drawing, and to make six cups, more water should be added to bring the water level up to the highest graduation indicated on the drawing. The plug or closure 13 is tightly screwed back into the upper end of the tube 12.

Then the glass lid or top 17 is removed and a circular piece of filter paper 21 is fitted over the entire surface of the bottom of the coffee infusing receptacle 7 and a quantity of finely pulverized coffee, sufficient to make the predetermined number of cups of coffee, is placed upon the filter 21. The coffee retainer 22 then is placed on the upper surface of the coffee 23 and the pot is placed upon a stove or heater.

Until the water in the chamber has been heated to a point where a considerable quantity of steam is evolved, the vapor generated in the chamber 4 escapes through the vent hole or perforation 26 and continues to so escape until steam is being generated faster than can pass out through the vent or hole 26, whereupon steam pressure now builds up in the chamber 4 rapidly and the pressure thereof drives the water in said chamber upwardly through the pipe or tube 14. The water so elevated in the tube 14 is discharged into the coffee making receptacle 7 and this will continue until all the water above the lower end 14ᵇ of the pipe 14 has been transferred from the chamber 4 up into the coffee making receptacle 7.

This will substantially fill the coffee making receptacle 7 with boiling water above the coffee retainer 22. The water can seep only slowly through the layer of coffee 23 in the bottom of the receptacle 7 and the filter paper or cloth 21 and hence the capacity of the receptacle 7 should be sufficient to retain all the water which can be elevated from the chamber 4. The infusion of coffee thus made will seep through the filter 21, will pass through the perforations 11 in the bottom wall of the receptacle and will fall in drops into the collecting receptacle 2.

No particular care has to be taken by the user to remove the pot from the heater immediately after the coffee has been transferred up into the coffee making receptacle 7, because the end 14″ of the pipe 14 is well above the bottom 15 of the pot and a sufficient amount of water will be retained in the chamber 4 to prevent the boiling away of all the water therein prior to the time when the coffee is to be used.

The coffee falling into the drip collecting receptacle from the perforated bottom wall 10 of the receptacle 7 will be kept hot because it is jacketed by the steam which fills the water boiling chamber 4 and the vapor from the hot drip coffee contained in the receptacle 2 filling the upper part or coffee infusing chamber will maintain the coffee in the receptacle 7 hot until it shall have passed through the coffee 23 and through the filter 21 and perforations 11 into the drip collecting receptacle 2.

Having thus described our invention, what we claim and desire to protect by Letters Patent of the United States is:

In a utensil for automatically making French drip coffee, the combination with a casing, substantially circular in transverse horizontal cross-section and having an upper section and a lower section, of a drip collecting receptacle having the upper portion of its side wall snugly fitting and secured substantially steam-tight against the inner surface of said casing between said sections and closing said lower section to form a water boiling chamber and closing the said upper section to form a coffee infusing chamber, the side walls of said drip collecting receptacle below the upper margin thereof being spaced from the inner wall of said water boiling chamber, a removable coffee infusing receptacle suspended within the upper section of said casing and having impervious side walls spaced from the side walls of said casing and a pervious bottom wall disposed over said drip collecting receptacle, a filter fabric in said coffee making receptacle lying flat against said pervious bottom, a water elevating pipe rigidly secured to the outside of said casing and having its ends passing through said casing, the upper end thereof being in communication with the coffee infusing chamber above said infusing receptacle and the lower end thereof being in communication with the said water boiling chamber at a substantial distance above the bottom of said boiler, a closure for the top of said casing, a water supply pipe communicating with said water boiling chamber through a side wall of said casing and a removable steam-tight closure for the upper end of said supply pipe, said casing being provided with a minute aperture immediately below the point where said drip collecting receptacle is secured to the interior of said casing, for the escape of low pressure vapor, and the capacity of said infusing receptacle being slightly greater than the capacity of said water boiling chamber above the point where said water elevating tube enters said water boiling chamber and the capacity of said drip collecting receptacle being slightly greater than the capacity of said coffee making receptacle, said casing being also provided with a passage near the top of said drip collecting receptacle for the discharge of the contents of said drip collecting receptacle therethrough.

In witness whereof, we have hereunto set our hands this 30th day of September, 1929.

JOSEPH A. GUERIN, Sr.
JAMES M. GUERIN.